US011820653B2

(12) United States Patent
Schwefer et al.

(10) Patent No.: US 11,820,653 B2
(45) Date of Patent: Nov. 21, 2023

(54) METHOD FOR OXIDIZING AMMONIA AND SYSTEM SUITABLE THEREFOR

(71) Applicant: THYSSENKRUPP INDUSTRIAL SOLUTIONS AG, Essen (DE)

(72) Inventors: Meinhard Schwefer, Meschede (DE); Rolf Siefert, Rheda-Wiedenbrück (DE); Klaus Ruthardt, Dortmund (DE); Alberto Cremona, Castell'Arquato (IT); Edoardo Vogna, Novara (IT)

(73) Assignee: Thyssenkrupp Industrial Solutions AG, Essen (DE)

( * ) Notice: Subject to any disclaimer, the term of this patent is extended or adjusted under 35 U.S.C. 154(b) by 286 days.

(21) Appl. No.: 16/534,044

(22) Filed: Aug. 7, 2019

(65) Prior Publication Data
US 2019/0359486 A1 Nov. 28, 2019

Related U.S. Application Data

(62) Division of application No. 14/776,422, filed as application No. PCT/EP2014/000669 on Mar. 13, 2014, now Pat. No. 10,414,654.

(51) Int. Cl.
*C01B 21/26* (2006.01)
*B01J 23/34* (2006.01)
(Continued)

(52) U.S. Cl.
CPC ........... *C01B 21/265* (2013.01); *B01J 23/002* (2013.01); *B01J 23/34* (2013.01); *B01J 23/83* (2013.01);
(Continued)

(58) Field of Classification Search
CPC ....... C01B 21/265; C01B 21/28; C01B 21/38; B01J 37/036
(Continued)

(56) References Cited

U.S. PATENT DOCUMENTS 3,888,792 A 6/1975 Hughes
3,962,138 A 6/1976 Ray
(Continued)

FOREIGN PATENT DOCUMENTS

CN 101678297 A 3/2010
DE 1040002 B 10/1958
(Continued)

OTHER PUBLICATIONS

Perez-Ramirez et al., "Formation and control of N20 in nitric acid production—Where do we stand today", Applied Catalysis B: Environmental, (2003), vol. 44, pp. 117-151.
(Continued)

*Primary Examiner* — Anita Nassiri-Motlagh
(74) *Attorney, Agent, or Firm* — AVEK IP, LLC (57) ABSTRACT

A system suitable for oxidizing ammonia with oxygen in the presence of catalysts is described. The system includes a reactor equipped with at least one supply line for a reactant gas mixture and at least one discharge line for a process gas; a catalyst comprising at least one transition metal oxide that is not an oxide of a platinum metal; and a device for adjusting a molar ratio of oxygen to ammonia of less than or equal to 1.75 mol/mol in the reactant gas mixture by mixing an oxygen-containing gas stream having an $O_2$ content of <20% by volume with a chosen amount of ammonia. The oxygen-containing gas stream is produced by a device for: diluting an air stream with a gas stream comprising less than 20% by volume oxygen; or depleting oxygen from an oxygen-containing gas mixture, preferably from air; or by a combination thereof.

19 Claims, 6 Drawing Sheets

(51) Int. Cl.

| | | |
|---|---|---|
| *B01J 23/83* | (2006.01) | |
| *B01J 23/00* | (2006.01) | |
| *B01J 23/843* | (2006.01) | |
| *B01J 23/86* | (2006.01) | |
| *B01J 23/889* | (2006.01) | |
| *B01J 37/03* | (2006.01) | |
| *C01B 21/38* | (2006.01) | |
| *C01B 21/28* | (2006.01) | |
| *B01J 35/04* | (2006.01) | |
| *B01J 37/00* | (2006.01) | |
| *B01J 37/08* | (2006.01) | |

(52) U.S. Cl.
CPC ........... *B01J 23/8437* (2013.01); *B01J 23/86* (2013.01); *B01J 23/8892* (2013.01); *B01J 37/036* (2013.01); *C01B 21/28* (2013.01); *C01B 21/38* (2013.01); *B01J 35/04* (2013.01); *B01J 37/0018* (2013.01); *B01J 37/0036* (2013.01); *B01J 37/033* (2013.01); *B01J 37/082* (2013.01); *C01P 2002/34* (2013.01)

(58) Field of Classification Search
USPC ...................................................... 423/239.1
See application file for complete search history.

(56) References Cited

U.S. PATENT DOCUMENTS

| | | | |
|---|---|---|---|
| 4,124,687 A | 11/1978 | Whelan | |
| 4,183,906 A | 1/1980 | Blakey | |
| 4,692,321 A | 9/1987 | James | |
| 4,812,300 A | 3/1989 | Quinlan | |
| 5,131,220 A * | 7/1992 | Linnhoff | F02C 6/10 60/772 |
| 5,736,116 A | 4/1998 | LeBlanc | |
| 5,849,257 A | 12/1998 | Fujiwara | |
| 6,165,435 A * | 12/2000 | Echegaray | C01B 21/262 423/392 |
| 2009/0108239 A1 | 4/2009 | Caro | |
| 2010/0181530 A1 | 7/2010 | Kneuper | |
| 2011/0002836 A1 | 1/2011 | Dubois | |
| 2012/0034148 A1 | 2/2012 | Schwefer | |
| 2012/0183467 A1 | 7/2012 | Qi | |
| 2013/0039828 A1 | 2/2013 | Coupland | |

FOREIGN PATENT DOCUMENTS

| | | |
|---|---|---|
| DE | 20148707 A | 6/1972 |
| DE | 19903616 A | 8/2000 |
| DE | 102005023605 A | 11/2006 |
| DE | 102012000419 A | 7/2012 |
| EP | 384563 A | 8/1990 |
| EP | 799792 A | 10/1997 |
| EP | 0834466 A | 4/1998 |
| GB | 1342577 A | 1/1974 |
| KR | 2000004203 A | 7/2000 |
| RU | 2296706 C | 4/2007 |
| WO | 9828073 A | 7/1998 |
| WO | 9925650 A | 5/1999 |
| WO | 9925652 A | 5/1999 |
| WO | 0149603 A | 7/2001 |
| WO | 02090256 A | 11/2002 |
| WO | 2006010904 A | 2/2006 |
| WO | 2009028949 A | 3/2009 |
| WO | 2014114764 A | 7/2014 |

OTHER PUBLICATIONS

"Nitric acid", inorganic chemical industry, (1998), pp. 1-7, US Environmental Protection Agency.

Perez-Ramirez et al., "Mechanism of ammonia oxidation over oxides studied by temporal analysis of products", Journal of Catalysis, (2007), vol. 250, pp. 240-246.

Sadykov et al., "Oxide catalyst for ammonia oxidation in nitric acid production: properties and perspectives", Applied Catalysis A: General 204 (2000) 59-87. (Year: 2000).

Mischenko K.P., Ravdel A.A., Kratkii Spravochnik Fisico-himicheskih Velichin, Leningrag, Himiya, 1972, pp. 149-150, Table 78, and Machine Translation of Search Report citing same.

Schmidt-Szalowski, Krawcyzk et al., The Properties of Cobalt Oxide Catalyst for Ammonia Oxidation, Applied Catalysis A: General 175, (1998), pp. 147-157.

Gregory Biausque et al., The Reaction Mechanism of the High Temperature Ammonia Oxidation to Nitric Oxide Over LC0O3, Journal of Catalysis 276 (2010), pp. 306-313.

Andrew, S.P.S. et al, The Loss in Selectivity of a Cobalt Oxide Ammonia Oxidation Catalyst, in Studies in Surface Science and Catalysts; 6 (1980), 141 (Catalyst deactivation: Proceedings of an International Symposium, Antwerp, Oct. 13-15, 1980), pp. 141-148.

Hatcher, et al., Ammonia Oxidation Catalyst Handbook, 12.2, pp. 2575-2592.

Hou et al, Catalytic Oxidation of Ammonia to NO Over Perovskite-Type LaMnO3 and LaVO4 Catalysts, Catal. Lett. 2011) 141, pp. 1215-1218.

Machine Translation of Bohland, et al., Inorganic Nitrogen Compounds, 1173, Winnacker Küchler, Chemische Technik—Prozesse und Produkte, 2005.

PCT Application No. PCT/EP2014/000669 International Search Report and Written Opinion dated May 19, 2014, 12 pages.

* cited by examiner

METHOD FOR OXIDIZING AMMONIA AND SYSTEM SUITABLE THEREFOR

CROSS-REFERENCE TO RELATED APPLICATIONS

This application is a divisional application of U.S. patent application Ser. No. 14/776,422, filed Sep. 14, 2015, which is pending and is the national stage entry of International Patent Application No. PCT/EP2014/000669, filed Mar. 13, 2014, which designed the United States, and which claims priority to German Patent Application DE 102013004341.7, filed Mar. 14, 2013. Each of these documents is incorporated by reference herein in its entirety.

BACKGROUND

Field of the Invention

The invention relates to an improved method for oxidizing ammonia for the production of nitrogen oxides, which is used in particular in the production of nitric acid and of caprolactam. The invention relates also to an improved system for producing oxidation products of ammonia.

State of the Art

In the large-scale production of nitrogen-containing base materials for the chemical industry, the catalytic oxidation of ammonia ($NH_3$) to $NO_x$-nitrogen oxides often forms a base reaction. Mention may be made here of the production of nitric acid ($HNO_3$) as a starting material, for example, for nitrate-containing fertilizers, or of the production of hydroxylamine or hydroxylammonium salts for the production of caprolactam and thus of polyamides.

The following statements concerning the prior art relate by way of example to the production of $HNO_3$ by catalytic oxidation of $NH_3$.

The production of nitric acid is one of the most well-established processes of chemical technology, which was developed to industrial maturity following the introduction of the Haber-Bosch process for $NH_3$ synthesis by W. Ostwald on the basis of platinum catalysts and the design of which still forms the basis of modern $HNO_3$ production even today.

The first commercial system with a platinum catalyst (grooved strips of Pt film) for the production of 1500 tonnes of ammonium nitrate per year was thus constructed in 1906 in Gerthe bei Bochum. A short time later (1909), the first patents relating to the use of woven platinum screens as catalysts appeared. Slightly later again, these were then alloyed with rhodium. Although the catalyst involves high investment costs and is consumed during the $NH_3$ oxidation (platinum burns off), these catalyst systems are still in use today and, in modified form (customized knitted fabrics), still represent the prior art (see Winnacker Küchler, Chemische Technik—Prozesse and Produkte, 5th Edition, Volume 3, Chapter 3, p. 248-275, Wiley-VCH Verlag GmbH & Co. KGaA).

Recently, increased use has been made of platinum metal screens with high Pd contents, because they permit not only a certain reduction of costs but also a reduction of the laughing gas ($N_2O$) which is undesirably formed in the $NH_3$ oxidation and which is a greenhouse gas.

Conventional dimensions for platinum metal screens, which are stretched over a wide area in an ammonia oxidation reactor frequently referred to as a "burner", are in the range of from 0.5 to 5 m diameter. The thickness of the screen packing is conventionally from a few millimeters to approximately two centimeters, depending on the number of screens used.

A gas mixture typically comprising approximately from 9 to 12% by volume $NH_3$ and air flows through the screens, a temperature of approximately from 800 to 950° C. being established at the screens as a result of the exothermic nature of the oxidation reaction. $NH_3$ is thereby oxidized very selectively to nitrogen monoxide (NO) (see reaction scheme 1 below), which is then oxidized in the course of the further process to nitrogen dioxide ($NO_2$) (reaction scheme 2) and finally is converted to $HNO_3$ with water in an absorption tower (reaction scheme 3).

Primary $NH_3$ oxidation—target reaction:

$$4NH_3 + 5O_2 \rightarrow 4NO + 6H_2O \tag{1}$$

NO oxidation:

$$2NO + O_2 \rightarrow 2NO_2 \tag{2}$$

$HNO_3$ formation:

$$3NO_2 + H_2O \rightarrow 2HNO_3 + NO \tag{3}$$

The brutto reaction resulting therefrom is:

$$NH_3 + 2O_2 \rightarrow HNO_3 + H_2O \tag{4}$$

Even though the $O_2$ content of 21% by volume in the combustion air is accordingly just sufficient formally to ensure complete conversion of 10% by volume $NH_3$ to $HNO_3$, in the commercial production of $HNO_3$ further atmospheric oxygen (secondary air) is supplied to the process gas (also referred to as "process gas") after the catalytic $NH_3$ oxidation and before entry into the absorption tower, in order to accelerate the NO oxidation and thus the formation of $HNO_3$ in the absorption tower. The residual content of oxygen in the waste gas leaving the absorption tower is typically approximately from 1 to 5% by volume.

According to current understanding of the primary oxidation reaction (see Handbook of Heterogeneous Catalysis, 2nd Edition, Volume 5, 2008, Chapter 12.2.7.1, p. 2582, WILEY-VCH Verlag GmbH & Co. KGaA, 2008), a high partial oxygen pressure is required in the combustion of the $NH_3$ in order to suppress the formation of nitrogen and laughing gas, as valueless secondary products, on the surface of the catalyst. This observation is in agreement with the stoichiometries of the formation of $N_2$ and $N_2O$ (see reaction schemes 5 and 6 below), which require less oxygen compared with NO formation (reaction scheme 1).

Primary $NH_3$ oxidation—secondary reactions:

$$4NH_3 + 3O_2 \rightarrow 2N_2 + 6H_2O \tag{5}$$

$$4NH_3 + 4O_2 \rightarrow 2N_2O + 6H_2O \tag{6}$$

The formation of $NO_2$, which according to reaction scheme (7) would require an increased amount of oxygen, does not take place on platinum metal catalysts.

$$4NH_3 + 7O_2 \rightarrow 4NO_2 + 6H_2O \tag{7}$$

The formation of the secondary products, or $NO_x$ selectivity, is also dependent on the general operating pressure of the $NH_3$ oxidation. The higher the pressure, the lower the $NO_x$ yield. The $NO_x$ yields which can be achieved according to the current prior art with different process variants (combustion pressures) are shown in the following table (taken from (Winnacker-Küchler, Chemische Technik—Prozesse and Produkte, 5th Edition, Volume 3, Chapter 3, p. 248-275, Wiley-VCH Verlag GmbH & Co. KGaA).

| Combusiton pressure | NH₃ content before the screen | NOₓ yield |
|---|---|---|
| atmospheric | 12.0-12.5% by volume | 95-98% |
| Medium pressure (3-6 bar) | 9.5-11.0% by volume | 93-97% |
| High pressure (7-14 bar) | 10.0-11.0% by volume | 90-95% |

A shortcoming of the platinum metal screen catalysts is, however, the only low stability of the catalyst at the high operating temperature of approximately 900° C. The burning off of the noble metal causes the catalyst to be consumed, at approximately from 0.04 to 0.4 g Pt/t $HNO_3$, according to the prevailing combustion pressure, so that the catalyst must be renewed at regular intervals, approximately every 3 months to 15 months according to the combustion pressure. This leads to not inconsiderable costs, even if a portion of the platinum which has been burnt off is recovered by various catcher systems (e.g. Pd screens).

On account of these disadvantages, attempts have repeatedly been made to develop alternative metal-oxide-based catalyst materials in order in particular to save platinum. An overview of the many different efforts to use oxidic catalysts is given in Sadykov et al., Appl. Catal. General A: 204 (2000), p. 59-87. Thus, especially in Eastern Europe, catalyst systems based on doped iron oxides have been used, often also in combination with platinum metal screens, while in the western hemisphere, cobalt-oxide-based systems have predominantly been employed.

However, none of these attempts at establishing platinum-metal-free $NH_3$ oxidation catalysts has hitherto been able to gain acceptance in industry because such catalysts exhibit lower selectivities of the NO formation as compared with highly selective platinum metal catalysts, and in modern systems for $HNO_3$ production, the product price is determined to the extent of more than 70% by the $NH_3$ price.

In many cases, the potentially active, noble-metal-free transition metal oxide catalysts also experience a considerable deactivation over time under conditions of practice, which is caused not only by sintering effects due to the high thermal stress but often also by a (partial) reduction of the oxides with $NH_3$ to correspondingly lower-valent oxides, which generally exhibit a lower activity and selectivity for NO formation. Mention may be made, for example, of the reduction of $MnO_2$ and $Mn_2O_3$ to $Mn_3O_4$, the reduction of $CuO_2$ to CuO, the reduction of $\alpha$-$Fe_2O_3$ to $Fe_3O_4$ and FeO or, particularly prominently, the reduction of highly active $Co_3O_4$ to less active CoO.

In order to counteract such a deactivation, in the case of a commercial use of $Co_3O_4$ catalysts for $NH_3$ oxidation in a fixed bed reactor of Incitec Ltd. in Australia, the catalyst bed was periodically rearranged in order to reoxidize with residual oxygen in the rear portion of the catalyst bed the catalyst reduced at a high $NH_3$ concentration in the front portion of the catalyst bed. The same idea is also pursued by corresponding works of Schmidt-Szalowski et al. (see Appl. Catal. A: General 177 (1998), p. 147-157), which publicize the oxidation of $NH_3$ via $Co_3O_4$ catalysts in a fluidized bed. The swirling of the catalyst particles is here said to effect in the lower portion of the fluidized bed a continuous reoxidation with oxygen of the CoO that is formed.

A further possibility, which has been investigated many times, for suppressing the deactivating reduction of the oxides is the doping, that is to say stabilization, of the above-mentioned binary oxides with other metal oxides which are difficult to reduce, which is, however, often accompanied by a reduction in the specific activity, as described by Sadykov et al. in Appl. Catal. General A: 204 (2000) p. 59-87. Mention may be made by way of example of the doping of $\alpha$-$Fe_2O_3$ with $Al_2O_3$, which formed the basis for the two-stage catalyst systems developed in the 1970s in the USSR for $NH_3$ oxidation in combination with a reduced amount of conventional Pt/Rh screen catalysts. The transition metal oxides can also be converted by doping with other metal oxides into ternary mixed oxides having different crystal structures, in which the higher oxidation states of the transition metals have a reducibility which is in principle low. Mention may be made especially of perovskitic structures, which are distinguished by a high activity for the formation of NO and a high chemical stability.

For example, U.S. Pat. No. 4,812,300 A claims mixed oxide catalysts of the perovskite type having the general formula $ABO_{3\pm\delta}$ for ammonia oxidation, wherein A represents alkali metals, alkaline earth metals, lanthanides or actinides, and B represents one or more elements of groups IB, IVB to VIIB and VIII. The catalysts are said to exhibit an equilibrium oxygen partial pressure of greater than $10^{-15}$ bar at 1000° C., so that a good transfer of the lattice oxygen to the $NH_3$ molecule is possible without the structural integrity of the perovskite being impaired. Testing of the catalysts was here carried out in an apparatus or under conditions of temperature-programmed reduction (TPR) at ambient pressure and an $NH_3$ concentration of 3.3% by volume and an oxygen content of 6.7% by volume in helium. Particularly preferred perovskite catalysts comprise lanthanum and/or strontium as the A-position element and cobalt, nickel and/or manganese as the B-position element.

WO-99/25650 A1 describes a device for $NH_3$ oxidation in which there are preferably used mixed oxide catalysts formed of rare earth metals and cobalt. The oxidation of 10% by volume $NH_3$ in air at atmospheric pressure with a lanthanum/cerium/cobalt mixed oxide (atomic ratio La:Ce:Co=8:2:10) is described by way of example.

U.S. Pat. No. 3,888,792 A describes the use of $Co_3O_4$ doped with rare earth metals for $NH_3$ oxidation, which is said to have increased selectivity and long-term stability as compared with pure $Co_3O_4$. The testing of chosen samples was carried out at an $NH_3$/air volume ratio of 1/10 under atmospheric pressure. In a long-term test over 900 hours with Ce-doped $Co_3O_4$, in which an intermediate pressure increase to 7 bar also took place, the yield of $NO_x$ was always more than 90%.

WO 2009/028949 A1 claims mixed oxide catalysts for the production of NO by reaction of a gas mixture consisting of $NH_3$ and $O_2$, which catalysts satisfy the general formula $A_{3-x}B_xO_{9-y}$. A and B are selected from metals of the group Mn, Cr, Co, Fe and Al. The catalysts were tested at atmospheric pressure with a gas mixture having a composition of 10% by volume $NH_3$ in air or 10% by volume $NH_3$, 18% by volume $O_2$ and 72% by volume argon. The maximum $NO_x$ selectivity achieved of 96% was attained with a mixed oxide having the composition $Mn_{1.5}Co_{1.5}O_4$.

As a further example, mention may be made of U.S. Pat. No. 3,962,138 A. Catalysts for $NH_3$ oxidation which consist of 60-95% $Co_3O_4$, 5-15% $Al_2O_3$ and 0-25% of an oxide of thorium, cerium, zinc or cadmium are claimed therein. The shaped catalysts were tested in a reactor having a diameter of 10 cm at a pressure of 4-5 bar with a gas mixture comprising 10% by volume $NH_3$ in air. With the best catalysts, each of which contained approximately 10% $ThO_2$, an $NO_x$ yield of approximately 93-95% was achieved after an operating time of 400 hours. The addition of $Al_2O_3$ and $ThO_2$ brought about a significant improvement in the $NO_x$ yield and the lifetime of the catalysts.

DE 10 2012 000 419 A1 discloses a low-temperature oxidation of ammonia in the production of nitric acid by passing an ammonia- and oxygen-containing gas stream over a support layer, heated to less than 500° C., of particles of an LaSrCo oxide catalyst and then cooling the nitrogen-oxide-containing gas stream. This reaction is described by way of example by the reaction of a gas stream which contained 5% by volume carbon dioxide, 5% by volume water, 10% by volume oxygen, 200 ppm ammonia and nitrogen as the remainder.

In WO 2006/010904 A1 there are described oxidation methods which are carried out on selected perovskite catalysts. The catalysts comprise bismuth and/or lanthanides with the exception of lanthanum. The oxidation of ammonia in air is described as a model reaction.

DE 199 03 616 A1 describes a method for producing nitrogen oxides having a low degree of oxidation by catalytic oxidation of ammonia in a mixture with air and steam on an oxidation catalyst. Catalysts comprising noble metals or catalysts comprising metal oxides are mentioned.

WO 01/49603 A1 discloses a catalyst comprising cerium oxide and manganese oxide as well as magnesium, aluminum, zinc or calcium oxide, and an activator for the selective oxidation of ammonia with oxygen to dinitrogen oxide $N_2O$. The reaction takes place at relatively low temperatures of 250° C. or below.

In DE 2 148 707 A there is described a catalyst for the oxidation of ammonia to nitrogen oxides. This catalyst consists mainly of cobalt oxide and is characterized by a specific surface area of from 0.1 to 7 $m^2/g$ and a volume/weight porosity of from 1 to 15%.

U.S. Pat. No. 5,849,257 describes a method for producing nitrogen oxides in which ammonia is reacted with oxygen in the presence of steam on a copper/manganese oxide catalyst. The catalyst is characterized by a specific X-ray spectrum.

EP 0 384 563 B1 describes a method for oxidizing ammonia in the presence of a cobalt oxide catalyst which has been doped with lithium.

US 2013/0039828 A1 discloses a catalyst structure which is suitable for an ammonia oxidation method and is distinguished by a flexible arrangement of catalyst units. Catalysts can comprise platinum metals or also other metals.

In a scientific publication [J. Catal. 276 (2010) 306-313], Biausque and Schuurmann describe the mechanism of the high-temperature oxidation of $NH_3$ to NO over an $LaCoO_3$ catalyst. To that end, various tests are carried out inter alia with variation of the $O_2$ and $NH_3$ content, wherein in one test series—starting from an $NH_3$ concentration of 3% by volume—the oxygen content was varied between 10% by volume and 40% by volume and in a further test series—starting from an oxygen content of 20% by volume—the $NH_3$ content was varied between 1% by volume and 5% by volume. With regard to the $NO_x$ yield achieved, a negative dependence on the $O_2$ partial pressure and a positive dependence on the $NH_3$ partial pressure was found. That is to say, as the $O_2$ partial pressure increases and the $NH_3$ partial pressure falls, an increased formation of $N_2$ and $N_2O$ was observed, which is contrary to the known behavior of platinum catalysts for $NH_3$ oxidation.

In Catal. Lett. (2011) 141: 1215-8, Tianfeng Hou et al. describe the catalytic oxidation of ammonia to nitrogen monoxide in the presence of perovskite catalysts of the $LaMnO_3$ and $LaVO_4$ type.

In many of the cases from the prior art cited above, the oxidation of $NH_3$ in air, as is usual in the conventional Ostwald process, is studied or, in the practical examples, a corresponding $O_2/NH_3$ volume ratio of at least 1.9 is established. In almost all cases, the studies or published data are additionally limited to atmospheric conditions, which yield significantly higher selectivities of the NO formation than are to be expected for elevated pressures.

Nevertheless, the high benchmark of $NO_x$ yields set with Pt/Rh screen catalysts is not achieved. This is the case in particular also with high throughputs of $NH_3$, that is to say at a high starting concentration of 10% by volume and elevated operating pressure, which are advantageous and conventional for commercial operation owing to the resulting smaller apparatus sizes and optimal adaptation to the subsequent $NO/NO_2$ absorption. The yield of $NO_x$ is thus usually reduced at a high concentration or high (partial) pressure of ammonia. This is the case in particular for known oxide-based catalysts such as, for example, $Co_3O_4$ (see, for example, Andrew, S.P.S.; Chinchen, G. C., "The loss in selectivity of a cobalt oxide ammonia oxidation catalyst" in "Studies in surface science and catalysis"; 6 (1980), p. 141-148, (Catalyst deactivation: proceedings of an international symposium, Antwerp, Oct. 13-15, 1980)), which, compared with metal platinum-based catalysts, exhibit a significantly lower activity. A high partial pressure of ammonia promotes to an enhanced degree undesirable secondary and subsequent reactions, which lead to the formation of $N_2$ or also $N_2O$.

Despite various efforts, transition metal oxide catalysts for $NH_3$ oxidation therefore play no role in large-scale applications, apart from the mentioned occasional combination of iron-oxide-based catalysts with noble metal screens.

Pt/Rh screen catalysts are still used almost without exception. As mentioned above, according to the operating pressure of the $NH_3$ combustion (atmospheric/medium pressure/high pressure) and the prevailing pressure level of the $NO_x$ absorption in the absorption tower, it is possible to distinguish between different method or system variants (see also Winnacker-Küchler, Chemische Technik—Prozesse and Produkte, 5th Edition, Volume 3, Chapter 3, p. 248-275, Wiley-VCH Verlag GmbH & Co. KGaA, Weinheim, 2005; Thiemann, M., Scheibler, E., Wiegand, K. W. Nitric Acid, Nitrous Acid, and Nitrogen Oxides, Wiley-VCH Verlag GmbH & Co. KGaA, 2000).

Of importance today are especially the so-called single or mono-pressure method, in which medium pressure or high pressure are used both for the $NH_3$ combustion and for the $NO_x$ absorption, and the so-called dual pressure method with $NH_3$ combustion under medium pressure and $NO_x$ absorption under high pressure. The previously conventional systems with combustion at atmospheric pressure and medium-pressure absorption have today largely been superseded by the single pressure and dual pressure methods, which are more economical in the case of larger capacities.

Figure 1:
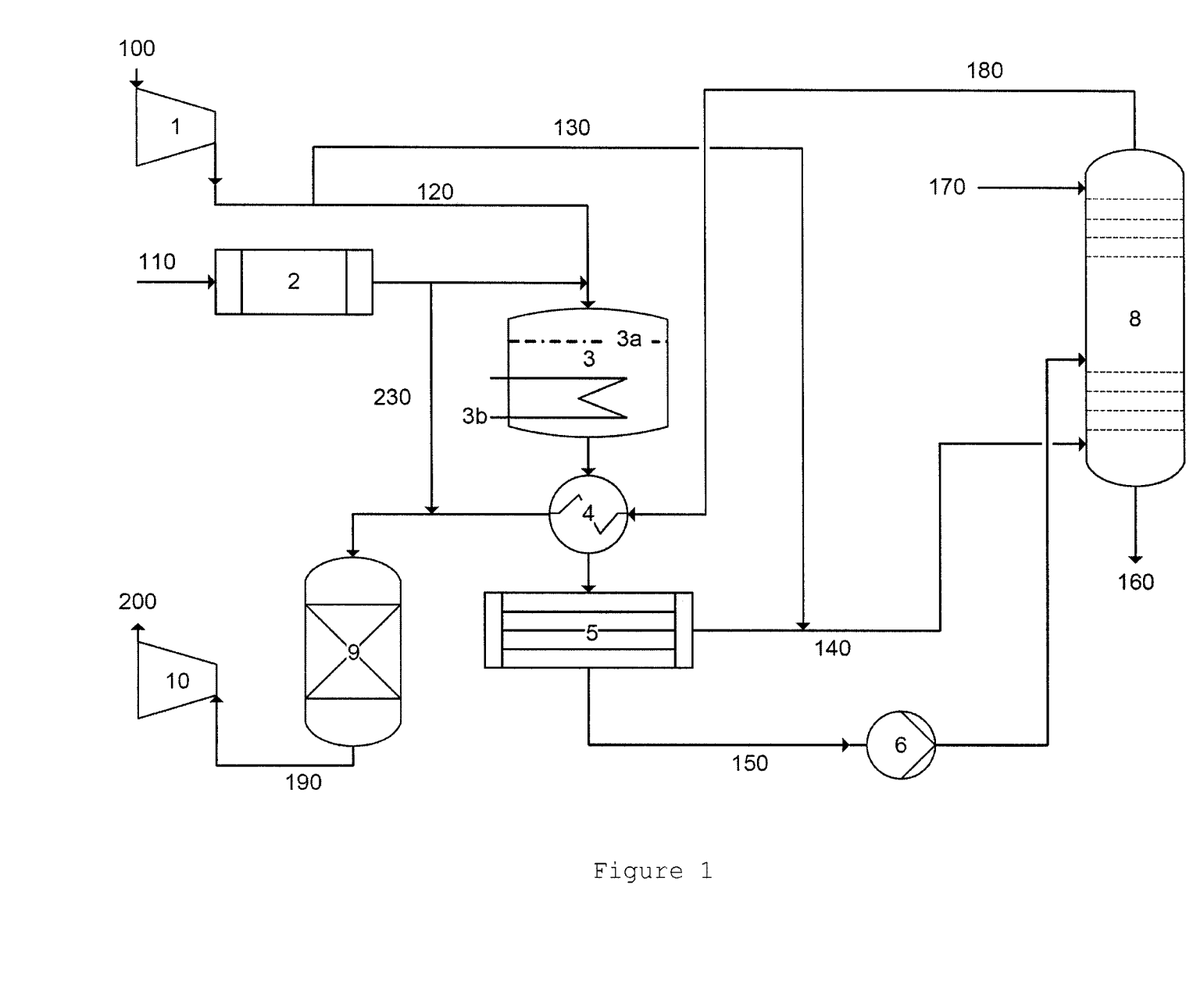
FIG. 1 shows a simplified schematic representation of a conventional mono-medium pressure system for producing nitric acid.

FIG. 1 shows a simplified flow diagram of a typical mono-medium pressure system.

Systems for producing $HNO_3$ thus typically comprise an $NH_3$ evaporator for providing gaseous $NH_3$, an air compressor for the combustion air, an $NH_3$ oxidation reactor for receiving the Pt screen catalysts with an integrated process gas cooler, various heat exchangers or coolers and condensers for further cooling the process gas or for heating the residual gas leaving the absorption tower, an absorption tower for absorbing $NO_x$ and forming $HNO_3$, a reactor for the (catalytic) removal of residual $NO_x$ and optionally $N_2O$ contained in the residual gas, and a residual gas turbine for energy recovery upon expansion of the residual gas into the atmosphere. In dual pressure systems, an additional compression stage for compressing the process gas to the desired absorption pressure is arranged between the $NH_3$ oxidation reactor and the absorption tower.

SUMMARY

Disclosed herein is a method, based on transition metal oxide catalysts, for oxidizing $NH_3$ and a system suitable therefor which, as compared with the yields achieved hitherto with such catalysts, is distinguished by increased yields of $NO_x$. The method is additionally to be distinguished by long catalyst lifetimes and low catalyst costs.

DESCRIPTION OF THE INVENTION

The object is achieved by the provision of a method for oxidizing ammonia with oxygen, wherein the ratio of $O_2$ and $NH_3$ in the reaction gas supplied to the catalyst is adjusted to a value significantly below the conventional ratio of 1.9 mol/mol, so that a high yield of $NO_x$ is achieved, and wherein catalysts that are different from the commercially available platinum metal screen catalysts hitherto used are employed.

Surprisingly, it has been found by us that, when non-platinum metal catalysts are used, that is to say selected transition metal oxide catalysts such as, for example, $LaCoO_3$ or $LaMnO_3$, the yield of the useful product $NO_x$ can be increased significantly if the oxygen content, or the $O_2/NH_3$ ratio, in the reactant gas mixture is so adjusted that almost all the oxygen is converted by ammonia according to the primary oxidation reactions (reaction schemes 1, 5, 6 and 7) and no or only a small amount of residual oxygen remains in the resulting product gas. A high oxygen excess, as is otherwise conventional, has a negative effect here.

It has been found that, by reducing the oxygen content, or the molar ratio of oxygen to ammonia, before entry of the reactant gas mixture into the catalyst bed, the yield of $NO_x$ can be raised to values which can otherwise be achieved only with platinum metal catalysts (Pt/Rh screens), even at elevated partial pressure of $NH_3$, that is to say elevated total pressure or with an elevated $NH_3$ concentration.

Accordingly, the present invention relates to a method for oxidizing ammonia with oxygen in the presence of catalysts comprising at least one transition metal oxide that is not an oxide of a platinum metal, wherein the ratio of the molar amounts of oxygen to ammonia at the inlet of the reactant gas mixture into the catalyst bed is adjusted to values of less than or equal to 1.75 mol $O_2$/mol $NH_3$.

Typically, the molar ratio of oxygen to ammonia that is to be adjusted according to the invention is in the range of from 1.25 to 1.75 mol $O_2$/mol $NH_3$. In particular, the molar ratio is from 1.30 to 1.75 mol $O_2$/mol $NH_3$, particularly preferably a ratio of from 1.35 to 1.60 mol $O_2$/mol $NH_3$ is adjusted and most particularly preferably a ratio of from 1.35 to 1.50 mol $O_2$/mol $NH_3$ is adjusted.

When a preferred variant of the method according to the invention is carried out, the ratio of the molar amounts of oxygen to ammonia in the reactant gas mixture at the inlet into the catalyst bed is so chosen that it is in the range of from 0.1 mol $O_2$/mol $NH_3$ below to 0.4 mol $O_2$/mol $NH_3$ above an optimal molar ratio, wherein the optimal molar ratio is the ratio of the molar amounts of oxygen to ammonia at the inlet of the reactant gas mixture into the catalyst bed at which a maximum yield of $NO_x$ is achieved.

Particularly preferably, the ratio of the molar amounts of oxygen to ammonia at the inlet into the catalyst bed is from 0.05 mol $O_2$/mol $NH_3$ below to 0.3 mol $O_2$/mol $NH_3$ above the optimal ratio, particularly advantageously from 0.025 mol $O_2$/mol $NH_3$ below to 0.25 mol $O_2$/mol $NH_3$ above the optimal ratio.

The optimal molar ratio of $O_2/NH_3$, or the optimal oxygen content, can be determined on the basis of a series of corresponding tests under the specifically desired method conditions, that is to say with a chosen catalyst in a defined system, at a defined space velocity and flow rate, at a defined outlet or inlet temperature, under a defined pressure and with a defined reaction medium comprising oxygen and a defined amount of ammonia. With a constant $NH_3$ concentration, the concentration of oxygen at the inlet into the catalyst bed is thereby so chosen that the corresponding molar $O_2/NH_3$ ratio is between a minimum $O_2/NH_3$ ratio of, for example, 1.25 mol/mol and a maximum $O_2/NH_3$ ratio of, for example, 1.75 mol/mol, the ratio is varied preferably by a chosen increment, for example an increment of less than or equal to 0.1 mol $O_2$/mol $NH_3$, and the yield of $NO_x$ achieved in each case is determined. The molar ratio of oxygen to ammonia which produces the maximum yield of $NO_x$ under the otherwise constant reaction conditions is the optimal ratio of oxygen to ammonia.

In another preferred variant of the method according to the invention, the ratio of the molar amounts of oxygen to ammonia at the inlet of the reactant gas mixture into the catalyst bed is adjusted to values of less than or equal to 1.75 mol $O_2$/mol $NH_3$, preferably to values of less than or equal to 1.60 mol $O_2$/mol $NH_3$ and particularly preferably to values of less than or equal to 1.50 mol $O_2$/mol $NH_3$, the oxygen content in the product gas at the outlet of the catalyst bed being at least 0.3% by volume, preferably at least 0.4% by volume and particularly preferably at least 0.5% by volume.

In a preferred embodiment of this preferred variant of the method according to the invention, a molar ratio of $O_2/NH_3$ that is suitable according to the invention of less than or equal to 1.75 mol $O_2$/mol $NH_3$, or an oxygen content in the reactant gas mixture at the inlet of the catalyst bed that is suitable according to the invention, is specified by the oxygen content of the product gas at the outlet of the catalyst bed, in that a molar ratio of $O_2/NH_3$ that is suitable according to the invention or—at a given $NH_3$ inlet concentration—an oxygen content at the inlet of the catalyst bed that is suitable according to the invention is so chosen that the resulting oxygen content in the product gas at the outlet of the catalyst bed is from 0.3% by volume to 10.0% by volume, preferably from 0.4% by volume to 6.0% by volume and particularly preferably from 0.5 to 4.0% by volume, most particularly preferably from 0.3% by volume to 2.0% by volume, in particular from 0.4% by volume to 2.0% by volume, most preferably from 0.5% by volume to 1.5% by volume.

The $O_2/NH_3$ ratio that is suitable according to the invention can in practice be adjusted for specific method conditions, that is to say with a chosen catalyst in a defined system, with a defined space velocity and flow rate, at a defined outlet or inlet temperature, under a defined pressure and with a defined reaction medium comprising oxygen and ammonia, in such a manner, for example, that, under those method conditions, starting from a predetermined $O_2/NH_3$ ratio, for example starting from a conventional $O_2/NH_3$ ratio of 1.9 mol/mol or in particular starting from an $O_2/NH_3$ ratio of 1.75 mol/mol, with a fixed amount of ammonia, the oxygen content at the inlet of the catalyst bed is reduced until the above-mentioned low oxygen contents are present or detected in the product gas at the outlet of the catalyst bed.

The $NO_x$ and $O_2$ content at the outlet of the catalyst bed can be determined by methods known to the person skilled in the art. For example, the $NO_x$ content can be determined by means of IR/UV analyzers using heated gas measuring cells. Suitable analyzers are, for example, multicomponent FT-IR or one-component systems having a plurality of IR or UV channels. Alternatively, the $NO_x$ content can also be measured by means of a chemiluminescence analyzer having an upstream converter for reducing $NO_2$ to NO. The oxygen content can advantageously be measured inter alia by means of a heated analyzer for measuring paramagnetism or by means of a zirconia sensor.

The oxygen content of the product gas at the outlet of the catalyst bed can also be determined arithmetically as the difference between the oxygen content in the reactant gas mixture at the inlet of the catalyst bed and the oxygen consumption in the catalyst bed. The oxygen consumption in the catalyst bed is obtained starting from the outlet concentrations of the components $N_2$, NO, $NO_2$ and $N_2O$ or the product selectivities derived therefrom from the $NH_3$ inlet concentration and the corresponding stoichiometric ratios of $O_2/NH_3$ according to equations (1), (5), (6) and (7).

The method according to the invention is preferably operated at pressures of from 1 bar abs. to 10 bar abs., particularly preferably at pressures of from 1.5 bar abs. to 6 bar abs., most particularly preferably at pressures of from 2 bar abs. to 5 bar abs.

The $NH_3$ concentration at the inlet into the oxidation reactor in the method according to the invention is preferably from 1 to 17% by volume, particularly preferably from 4 to 15% by volume, in particular from 7 to 14% by volume. The upper limit of the $NH_3$ content is advantageously determined by the lower explosion limit of the $NH_3$/oxygen mixtures, which is also dependent on other possible gas components, such as, for example, steam.

For each volume percent ammonia in the gas mixture that is converted chemically on the catalysts, a specific amount of heat is liberated which, in the case of a reactant mixture of $NH_3$ in air, corresponds to a temperature increase between the reactant mixture and the product mixture of approximately 68 K under adiabatic conditions. In the case where the temperature of the inlet mixture comprising ammonia and oxygen is specified by the system, the temperature in the process gas stream at the outlet of the oxidation catalyst is therefore specified by the ammonia concentration of the gas mixture at the inlet of the oxidation catalyst.

The catalyst used according to the invention develops its greatest capacity preferably in a lower temperature range than the platinum-based metal catalysts. The temperature at the outlet from the catalyst bed, for example from the arrangement of the shaped catalyst bodies, is to be adjusted according to the invention preferably to from 700° C. to 950° C., particularly preferably from 750° C. to 850° C. (measured at the outlet of the gas mixture from the catalyst bed or, in the case of a plurality of catalyst beds, at the outlet of the last catalyst bed). This can be achieved by adjusting the inlet temperature of the reactant gas mixture and/or the ammonia concentration in the reactant gas mixture.

The greater spatial extent of the arrangement of the shaped catalyst bodies used according to the invention, as compared with platinum-based metal catalyst screens, further permits polytropic operation by the partial dissipation or discharge of the heat of reaction. This can be achieved, for example, by cooling the reactor walls or by accommodating integrated cooling devices in the catalyst arrangement.

As already mentioned, the high activity of the shaped catalyst bodies permits a low reaction temperature or low "blow-out" temperature and thus a low inlet temperature of the reactant gas mixture comprising $NH_3$ and oxygen into the (first) catalyst bed, for example into an arrangement of shaped catalyst bodies. This inlet temperature can be from 20° C. to 300° C., preferably from 50° C. to 200° C., particularly preferably from 50° C. to 150° C.

Catalysts

There are suitable for the method according to the invention in principle any catalysts which contain as active component at least one transition metal oxide that is not an oxide of a platinum metal.

Within the context of this description, a platinum metal is an element of the 5th and 6th periods of groups 8 to 10 of the periodic system of the elements, that is to say an element of the group Ru, Rh, Pd, Os, Ir and Pt.

Under the operating conditions of the method according to the invention, that is to say at an $NH_3/O_2$ ratio, adjusted according to the invention, in the range of from 0.1 mol $O_2$/mol $NH_3$ below to 0.4 mol $O_2$/mol $NH_3$ above the optimal molar ratio, the catalysts used according to the invention surprisingly exhibit increased yields of $NO_x$, as compared with the yields of $NO_x$ under the operating conditions of the conventional methods of ammonia oxidation, in which the ratio of the molar amounts of oxygen and ammonia at the inlet of the reactant gas mixture into the catalyst is at least 1.9 mol $O_2$/mol $NH_3$.

Accordingly, under the operating conditions of the method according to the invention, the catalysts used according to the invention permit $NO_x$ yields which are comparable with or even better than the $NO_x$ yields in the Ostwald process using commercially available platinum metal screen catalysts.

Particularly suitable are catalysts which comprise transition metal oxides that are not oxides of platinum metals and do not experience any irreversible reduction to less active lower-valent oxides under the above-mentioned conditions.

There can accordingly be used in particular catalysts which comprise stabilized, that is to say doped, transition metal oxides that are not oxides of the platinum metals, or which comprise mixed oxides of such transition metal oxides. Examples of doped transition metal oxides are iron oxides doped with, for example, bismuth oxide, chromium oxide or manganese oxide.

The mixed oxides which can be used particularly preferably have a spinel, delafossite or, particularly preferably, a perovskite or brownmillerite structure.

Perovskites used according to the invention preferably have the structure $ABO_{3-\delta}$, wherein A represents mono-, di- or tri-valent cations and B represents tri-, tetra- or penta-valent cations, the ionic radius of A is greater than the ionic radius of B, and $\delta$ is a number from 0.001 to 1.5, preferably from 0.01 to 0.09 and particularly preferably from 0.01 to 0.5. Mixtures of different cations A and/or cations B can also be present in the perovskites used according to the invention.

Brownmillerites used according to the invention typically have the structure $A_2B_2O_{5-\delta}$, wherein A, B and δ have the meanings defined above. Mixtures of different cations A and/or cations B can also be present in the brownmillerites used according to the invention.

Cations B can occur within a compound preferably in a plurality of oxidation states. Some or all of the cations of type B can, however, also be tri- or higher-valent cations with a constant oxidation state.

The use of perovskites of the general empirical formula $ABO_{3\pm\delta}$ and/or of brownmillerites of the general empirical formula $A_2B_2O_{5\pm\delta}$ whose A position is occupied to the extent of more than 50%, preferably more than 80%, particularly preferably more than 95%, by one or more elements selected from the group of the rare earth metals and alkaline earth metals and whose B position is occupied to the extent of more than 50%, preferably more than 80%, particularly preferably more than 95%, by one or more elements selected from the group Cr, Mn, Fe, Co, Ni is particularly advantageous. Of those elements, Co is particularly preferred. A particularly suitable perovskitic compound is $LaCoO_{3\pm\delta}$ wherein δ is from 0.01 to 0.5.

Further suitable doping agents are in particular transition metals whose oxides are preferably in the tetravalent state, such as, for example, Ce or Mn.

There can of course be added to the catalysts used according to the invention small amounts of platinum metals or of oxides of platinum metals, for example up to 10% by weight, in particular up to 5% by weight, based on the active component(s) of catalyst. The presence of other metal (oxides) which are conventionally used as additional dopants is also possible. Examples of such dopants are alkali and/or alkaline earth metals. These dopants—where present—are also present in only small amounts, for example in amounts of up to 10% by weight, in particular up to 5% by weight, based on the active component(s) of catalyst.

The preparation of the catalytically active components, or transition metal oxides, used in the method according to the invention, and the shaping thereof, will be discussed only by way of example at this point, because various preparation methods suitable for this purpose are known to the person skilled in the art from practice. Technologies corresponding to the prior art which can be used for the preparation of the catalytically active components will be described hereinbelow.

The catalytically active components used in the method according to the invention can be prepared by means of a solid state reaction. To that end, mixtures of oxides, binary oxides, or oxide formers, for example carbonates, are conventionally used as starting materials. The starting materials are intimately mixed in a composition adapted to the target phase and are then calcined. The catalytically active phases form under calcination conditions in the form of crystallites.

In order to increase the homogeneity of the starting mixture, intensive grinding of the starting materials, optionally with the addition of auxiliary substances, such as, for example, water, is frequently carried out. In order to increase the conversion of desired crystal phase, a plurality of grinding and calcining steps can be carried out alternately. When a sufficient degree of crystallinity of target phase has been determined, a particle size that is suitable for further shaping treatment steps for producing the shaped catalyst bodies, such as extrusion or pressing, is carried out, for example by dry grinding.

A further suitable preparation method is the precipitation technique, in which the starting materials are obtained from solutions by precipitation. As precursors for metal oxides there can be used for this purpose, for example, metal hydroxides or complexed metal cations, for example in the form of citrates or oxalates, which can be precipitated from metal salt solutions, which can contain the primary component alone or the primary and secondary component, by means of precipitation reagents. Suitable precipitation reagents are, for example, alkalis, such as ammonia, or ammonium carbonate.

The hydrolysis of alkoxides can also be used to prepare precursors of the metal oxides. A particular technique which can be employed is so-called sol-gel synthesis, wherein stable colloidal systems are used as starting material instead of solutions. In the case of alkoxides there can be used as hydrolysis agents, for example, water or various alcohols. The stoichiometry of the metal oxide phases that are to be prepared is given by suitably choosing the relative proportions of the starting compounds, for example metal salts or alkoxides.

The metal oxide precursors so prepared are treated by filtration, washing and drying. In the calcination step which follows, the metal oxide phases are formed, which can be homogenized further by alternate grinding and calcination steps. There follow further steps of powder treatment, in particular grinding and fractionation, in order to make the resulting powders amenable to shaping by, for example, extrusion or pressing.

The catalytically active components can also be prepared by pyrolysis reactions. To that end, metal-containing starting materials, for example metal salts, organometallic compounds or products obtained by means of precipitation technology, are reacted in a highly exothermic reaction at high temperatures, for example up to 1000° C. In this type of preparation, oxidizing agents, for example ammonium nitrate, and organic fuels such as urea, citric acid or glycine, can be added to the starting materials. The pyrolysis reaction can be initiated starting from solutions, suspensions or solids. In this method, the stoichiometry of the target phase can be adjusted by suitably providing the starting materials. The resulting powders are of high phase purity with a high to very high specific surface area.

For the shaping of the transition metal oxide powders that are prepared, these and other active components or co-components can be incorporated or embedded into any desired, preferably ceramics, matrix or applied to any desired, preferably ceramics, support.

Preference is given to ceramics material based on oxides, carbides or nitrides of elements selected from the group Si, Al, Mg, Zr and B; particular preference is given to ceramics materials such as cordierite, mullite, magnesium oxide or, most particularly, silicon carbide, which is distinguished by high chemical and mechanical resistance and excellent thermal conductivity.

The use of solid catalysts, that is to say shaped bodies which consist substantially of catalytically active material, is also particularly suitable and preferred within the meaning of the invention. The shaped catalyst bodies are thus to consist of more than 70%, preferably more than 80%, particularly preferably more than 85%, based on the total weight of the shaped body, catalytically active material.

The shaped catalyst bodies can be in the form of shaped bodies of any size and geometry, preferably in geometries which have a large surface area to volume ratio and in which a minimal pressure loss is generated when a medium flows through them. Preference is given to shaped bodies in which the surface area to volume ratio is from 0.5 to 10 mm$^{-1}$, in particular from 1 to 5 mm$^{-1}$. Typical geometries are all geometries known in catalysis, such as, for example, cylinders, hollow cylinders, multihole cylinders, rings, broken granules, trilobes or honeycomb structures. Particular preference is given to honeycomb monoliths or so-called miniliths, that is to say very small honeycomb shaped bodies which are generally used as bulk material. The shaped bodies can be produced by shaping methods known in ceramics processing, such as, for example, dry pressing, granulation or extrusion.

The arrangement of the shaped catalyst bodies can be, for example, in the form of a random filling or in the form of an ordered packing.

Reactor

The ammonia oxidation reactor used according to the invention can be configured like a conventional ammonia oxidation reactor or "burner". This is particularly advantageous in the case of the retrofitting of existing systems because no or only negligible apparatus-related changes are necessary. The Pt/Rh screens are often located on a loose filling of ceramics rings. In the method according to the invention, the shaped catalyst body can then be fitted into the reactor in place of the Pt/Rh screens and ceramics rings, as already mentioned above, as a filling or as an ordered packing, for example of honeycomb bodies. Special precautions must generally be taken at the edge of the reactor to prevent a portion of the ammonia/oxygen-containing reactant gas mixture from flowing past the catalyst. Such precautions can be, for example, gas-tight, high-temperature-resistant metal strips which are connected to the wall of the reactor and on which the catalyst filling or the outer elements of the ordered catalyst packing rest in part.

In the case of new systems especially, it can be very advantageous to use alternative designs to the conventional design of ammonia oxidation reactors, which are characterized by a large diameter with a very small height of the catalyst packing in the flow direction. By reducing the flow cross-section, possible difficulties with the uniform distribution of the inflowing gas mixture can thus be reduced. A rapid flow through the catalyst bed with short dwell times is particularly preferred, because undesirable secondary reactions, such as the catalytic decomposition of the NO that forms, can thereby be suppressed and, in addition, a space-saving, compact design of the ammonia oxidation reactor is possible. For further possible configurations of the ammonia oxidation reactor, equipped with a catalyst according to the invention, reference is made to WO 2008/148487A1.

The method according to the invention is preferably operated at space velocities of from 50,000 h$^{-1}$ to 500,000 h$^{-1}$, particularly preferably from 100,000 h$^{-1}$ to 300,000 h$^{-1}$. Within the context of this description, the expression space velocity is understood as meaning the quotient of the volume fractions of gas mixture (measured at 273.15 K and 1.01325 bar) per hour, based on one volume fraction of catalyst, that is to say of the filling or packing volume. The space velocity can accordingly be adjusted via the volume flow of the gas and/or via the volume of the catalyst or the amount thereof.

Regardless of which design is preferred in a particular application, the ammonia oxidation reactor of the method according to the invention is preferably equipped with a device for igniting the reaction on the catalyst. For example, there can be used for this purpose a hydrogen flame from a movable lance directed at the gas inlet side of the shaped catalyst body.

Procedure

The molar ratio of $O_2/NH_3$ according to the invention in the gas stream at the inlet into the oxidation catalyst can be achieved technically in various ways.

In the simplest way, gaseous $NH_3$ can be added to an air stream in such an amount that the desired molar ratio of $O_2/NH_3$ results. An $NH_3$ content of from 14.4% by volume to 10.7% by volume in this case corresponds to a ratio of from 1.25 to 1.75 mol $O_2$/mol $NH_3$, an $NH_3$ content of from 13.9% by volume to 10.7% by volume corresponds to a ratio of from 1.3 to 1.75 mol $O_2$/mol $NH_3$, and an $NH_3$ content of from 13.5% by volume to 11.6% by volume corresponds to a ratio of from 1.35 to 1.6 mol $O_2$/mol $NH_3$.

Another possible step for adjusting the molar ratio of $O_2/NH_3$ according to the invention consists, for example, in supplying to the $NH_3$ combustion, together with the air or in place thereof, a gas stream which comprises less than 20% by volume, preferably less than 10% by volume, particularly preferably less than 5% by volume, oxygen.

When the method for oxidizing $NH_3$ according to the invention is integrated into a process for producing nitric acid or caprolactam, it is possible to supply to the $NH_3$ combustion, together with the air or in place thereof, preferably a certain proportion of the low-oxygen residual gas, for example removed downstream of a reactor for residual gas purification for $N_2O$ and $NO_x$ reduction. This is shown by way of example in FIG. 2 for a dual pressure $HNO_3$ system. The purified residual gas stream (210) is here expanded to the corresponding pressure level of the $NH_3$ combustion by a turbine (11) before being fed into the $NH_3$ combustion.

The recycled, purified residual gas is to have an oxygen content of <5% by volume, in particular <3% by volume, most particularly <2% by volume. The residual content of $NO_x$ is to be <20 ppmv, preferably <10 ppmv, particularly preferably <5 ppmv.

It is also possible for the air stream supplied to the $NH_3$ combustion to be divided into an $O_2$-reduced and an $O_2$-enriched partial stream, for example by a pressure swing adsorption, by a cryogenic decomposition or also by means of membranes, for example by means of a ceramics membrane that conducts oxygen anions. Such a form is shown by way of example in FIG. 3. The $NH_3$ to be burned, for example 10% by volume, is then added to the $O_2$-reduced partial stream having an $O_2$ content of, for example, 13% by volume $O_2$, while the $O_2$-rich partial stream is fed to the process gas downstream of the primary $NH_3$ oxidation.

The $O_2/NH_3$ ratio according to the invention can further be adjusted before the $NH_3$ is fed in and before contact with the $NH_3$ oxidation catalyst, by diluting the $O_2$-containing gas stream with steam. The steam can then be condensed out again after the $NH_3$ combustion upon cooling of the process gas stream before entry into the absorption tower, with the formation of weak acid.

The addition of other inert gas components to dilute the $O_2$-containing gas stream is also conceivable.

The above-mentioned possibilities for adjusting the molar ratio of $O_2/NH_3$ according to the invention do not constitute a conclusive list and can additionally also be used in any desired combination.

Systems

The invention relates also to a system for oxidizing ammonia, comprising:
A) a reactor (3) for ammonia oxidation equipped with at least one supply line for a reactant gas mixture and with at least one discharge line for a process gas, B) a catalyst (3a), inside the reactor (3), comprising at least one transition metal oxide that is not an oxide of a platinum metal, and
C) a device for adjusting a molar ratio of oxygen to ammonia of less than or equal to 1.75 mol/mol in the reactant gas mixture by mixing an oxygen-containing gas stream having an $O_2$ content of <20% by volume with a chosen amount of ammonia,
wherein the oxygen-containing gas stream is produced
c1) by a device for diluting an air stream with a gas stream that comprises less than 20% by volume, preferably less than 10% by volume, particularly preferably less than 5% by volume, oxygen, or
c2) by a device for depleting oxygen from an oxygen-containing gas mixture, preferably from air, or
c3) by a combination of measures c1 and c2.

The system according to the invention can be operated under elevated pressure. In this variant, the system comprises at least one compressor (1) by means of which an oxygen-containing gas stream, for example air, is compressed and supplied to a reactor (3) for ammonia oxidation. The ammonia can be supplied to the reactor (3) by introducing the ammonia into the compressed oxygen-containing gas stream.

Expanding the process gases from the reactor (3) or from system parts downstream of the reactor (3) to ambient pressure takes place downstream after leaving the reactor (3) or system parts located downstream of the reactor (3) by suitable measures known to the person skilled in the art. If the system according to the invention is used, for example, for producing nitric acid, oxygen-containing secondary gas, for example secondary air, is added to the nitrogen oxide produced in the reactor (3) and it is oxidized to $NO_2$ and introduced into an absorption tower (8), where the conversion of the $NO_2$ to nitric acid with water takes place. The nitrogen-oxide-containing residual gas from the absorption tower (8) leaves the absorption tower, is supplied to a residual gas purification (9), leaves the residual gas purification as purified residual gas, is then supplied to a residual gas turbine (10), where it is expanded with the recovery of energy and discharged into the environment.

The system according to the invention preferably comprises at least a second compressor for compressing the oxygen-containing secondary gas stream before entry into an absorption tower (8) in which the nitrogen oxide that is produced is treated with water.

In a particular embodiment, the dilution of the air stream according to c1) is carried out with steam and/or nitrogen having an $O_2$ content of <5% by volume.

In a further particular embodiment, the depletion of oxygen according to c2) from an oxygen-containing gas mixture, preferably from air, is carried out by pressure swing adsorption, cryogenic decomposition or by means of membranes.

The invention relates also to a system for oxidizing ammonia and subsequently absorbing $NO_x$, comprising:
a reactor (3) for ammonia oxidation equipped with at least one supply line for a reactant gas mixture and with at least one discharge line for a process gas,
a catalyst (3a), inside the reactor (3), comprising at least one transition metal oxide that is not an oxide of a platinum metal,
a device for adjusting a molar ratio of oxygen to ammonia of less than or equal to 1.75 mol/mol in the reactant gas mixture by mixing an oxygen-containing gas stream having an $O_2$ content of <20% by volume with a chosen amount of ammonia, wherein the oxygen-containing gas stream is produced:
c1) by a device for diluting an air stream with a gas stream that comprises less than 20% by volume, preferably less than 10% by volume, particularly preferably less than 5% by volume, oxygen, or
c2) by a device for depleting oxygen from an oxygen-containing gas mixture, preferably from air, or
c3) by a combination of measures c1 and c2,
an absorption tower (8) for absorbing $NO_x$ and forming $HNO_3$, $HNO_2$ or solutions of nitrates or nitrites, and
a device, arranged between the reactor (3) for ammonia oxidation and the absorption tower (8), for combining the $NO_x$-containing process gas stream with an oxygen-containing gas stream which comprises more than 25% by volume, preferably more than 30% by volume, particularly preferably more than 40% by volume, oxygen.

In a particular embodiment, the dilution of the air stream according to c1) is carried out with steam or with a nitrogen stream comprising less than 20% by volume, preferably less than 10% by volume, particularly preferably less than 5% by volume, oxygen. Particularly preferably, the nitrogen stream having an $O_2$ content of <5% by volume is removed from the residual gas line downstream of the absorption tower.

In a further particular embodiment, the depletion of oxygen according to c2) from an oxygen-containing gas mixture, preferably from air, is carried out by pressure swing adsorption, cryogenic decomposition or by means of membranes.

The production of the oxygen-containing gas stream which is combined according to E) with the $NO_x$-containing process gas stream is preferably carried out by oxygen enrichment of air by pressure swing adsorption, cryogenic decomposition or by means of membranes.

Further preferably, an addition of a stream containing a peroxide is carried out at the head of the absorption tower (8). The stream can be a liquid stream which comprises a dissolved peroxide. Examples thereof are solutions comprising an inorganic peroxide compound, such as hydrogen peroxide or perborate, or solutions comprising an organic peroxy compound, such as an organic peroxide, an organic hydroperoxide or an organic percarboxylic acid or esters thereof.

The above-mentioned systems for the oxidation of ammonia are preferably integrated into a system for producing nitric acid or caprolactam.

FIG. 1 shows a simplified flow diagram of a conventional mono-medium pressure system. In an air compressor (1), an air stream supplied through line 100 is compressed and supplied via line 120 to the reactor (3) for the ammonia oxidation. Before the compressed air enters the reactor (3), gaseous ammonia, which was previously supplied in liquid form via line 110 to an ammonia evaporator (2), is added to the compressed air in line 120. In addition, a portion of the compressed air is diverted from line 120 and supplied via line 130 as so-called secondary air to the process gas before it enters the absorption tower (8). In the reactor (3), in which platinum metal screens as catalysts (3a) are stretched over a wide area, the ammonia oxidation takes place, the ammonia for the large part being oxidized to NO and $H_2O$. The resulting product gas gives off a first portion of the heat of reaction to a heat exchanger (3b) in the waste heat portion of the reactor (3), leaves the reactor (3) and, with continued oxidation of the NO that forms by means of residual atmospheric oxygen or atmospheric oxygen supplied via line 130, passes through further heat exchangers (4) for further cooling of the process gas before it is then supplied to the absorption tower (8). At least one heat exchanger is in the form of a condenser (5), in which a portion of the resulting $NO_x$ and $H_2O$ is discharged as acid condensate, which in turn is supplied via line 150 to the absorption tower (8) using a pump (6). The remaining gas mixture, which still contains the majority of the $NO_x$, is combined with secondary air from line 130 and then introduced via line 140 into the absorption tower (8). The additional air supplied to the process gas serves to further oxidize the NO contained in the process gas to $NO_2$. The reaction of the $NO_x$ with water to nitric acid then takes place in the absorption tower (8), and the nitric acid leaves the absorption tower (8) via line 160. The required water is supplied to the absorption tower (8) via line 170. The nitrogen-oxide-containing residual gas from the absorption tower (8) leaves the absorption tower via line 180, passes inter alia through the heat exchanger (4), where it undergoes heating, and is supplied to the residual gas purification (9). In modern systems, a catalytic degradation of the $N_2O$ contained in the residual gas and of the $NO_x$-nitrogen oxides into nitrogen and oxygen or into nitrogen and water takes place with the addition of gaseous ammonia (line 230). The purified residual gas leaving the residual gas purification (9), which consists predominantly of nitrogen and small amounts of water and oxygen and optionally traces of residual nitrogen oxides, is then supplied via line 190 to a residual gas turbine (10), where it is expanded with the recovery of energy, leaves the turbine via line 200 and is discharged into the environment.

The flow diagram of a typical dual pressure system for the production of $HNO_3$ differs from the mono-medium pressure system shown in FIG. 1 by an additional compression stage, which is arranged in the line 140 downstream of the supply of the secondary air stream 130 and upstream of the inlet into the absorption tower (8).

Likewise not shown in FIG. 1 is a functional unit for bleaching the product acid with the secondary air stream. This can be integrated into the bottom portion of the absorption column or can also be in the form of a separate column which in a dual pressure system is arranged upstream of the supply of the secondary air stream 130 into the line 140 of the process gas stream downstream of the above-mentioned compression stage for the process gas.

Figure 2:
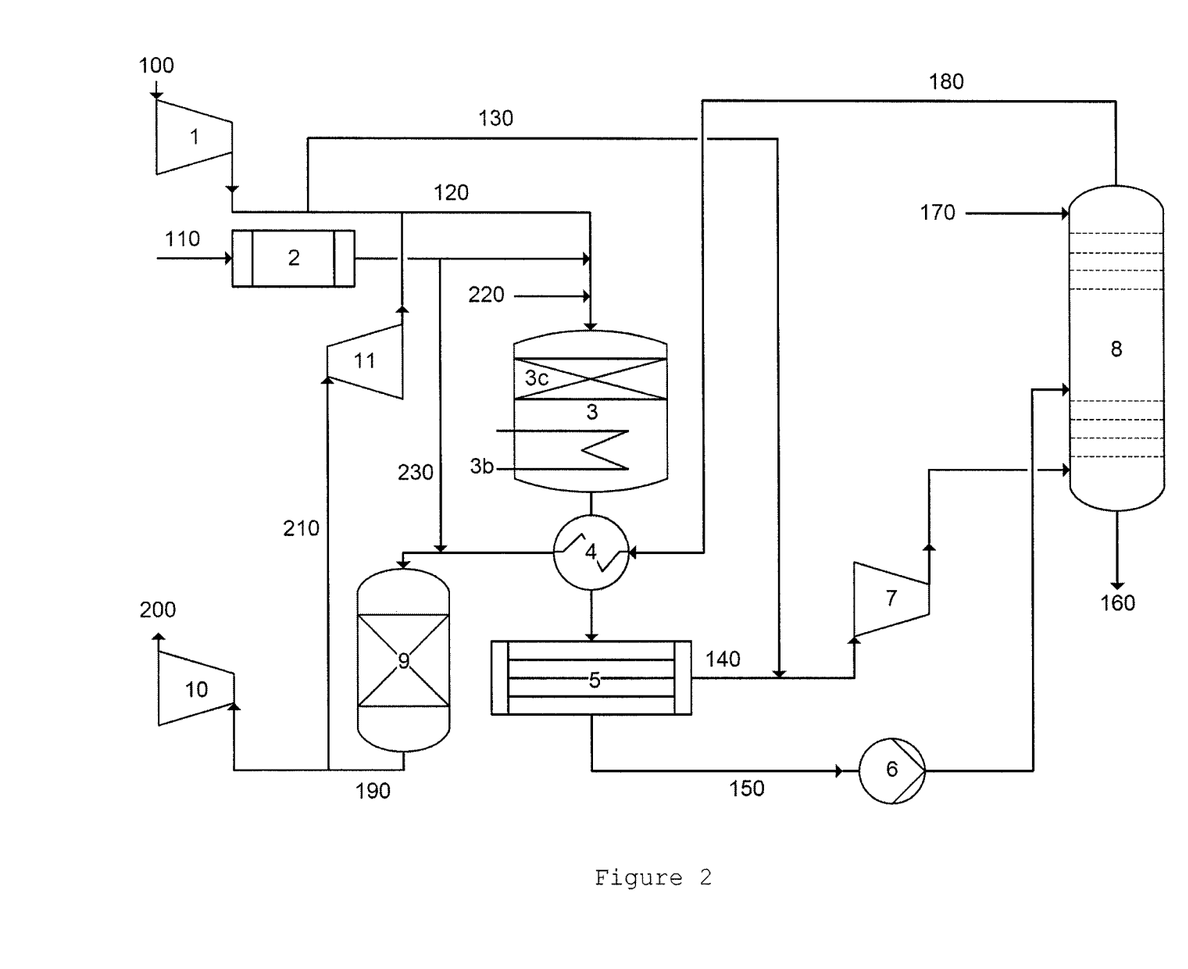
FIGS. 2 to 3 show schematic representations of variants of the method according to the invention/system according to the invention integrated into a dual pressure system for nitric acid production.

FIG. 2 shows by way of example a flow diagram of one or more variants of the method according to the invention and of one or more variants of a system according to the invention, using the example of a dual pressure nitric acid system.

Air compressor (1), ammonia evaporator (2), reactor (3), heat exchangers (3b, 4), condenser (5), pump (6), absorption tower (8), residual gas purification (9) and residual gas turbine (10) as well as lines 100, 110, 120, 130, 140, 150, 160, 170, 180, 190, 200 and 230 correspond to the elements shown in FIG. 1 in terms of their function and interconnection. Because this is a dual pressure system there is additionally shown, in contrast to FIG. 1, a compressor (7) by means of which the process gas from line 140 is compressed before it enters the absorption tower (8).

Furthermore, in contrast to FIG. 1, the catalyst (3c) is not a platinum metal screen but is in the form of a packing or filling of shaped catalyst bodies which comprise a transition metal oxide that is not an oxide of a platinum metal.

There is additionally provided in the system of FIG. 2 a line 220 through which a gaseous diluting medium having an oxygen content of <20% by volume, for example an oxygen-depleted air stream or steam, can be fed into the reactant gas mixture before it enters the reactor (3). It is additionally possible to supply a portion of the purified residual gas (containing predominantly nitrogen) coming from the residual gas purification (9) to an expander (11), before it enters the residual gas turbine (10), and to expand it sufficiently that it can be supplied to the compressed air in line 120.

By means of these measures (supply of a diluting medium having an oxygen content of <20% by volume via line 220 or partial recycling of the purified residual gas via line 210), individually or in combination, the ratio of oxygen to ammonia that is desired according to the invention in the reactant gas mixture can be adjusted in a controlled manner. It is further possible, by means of the system shown in FIG. 2 with or without the use of the supply lines 210 and 220, to adjust the ratio of oxygen to ammonia that is desired according to the invention in the reactant gas mixture by a primary air stream 120 that is reduced and a secondary air stream 130 that is increased as compared with conventional $HNO_3$ methods.

Figure 3:
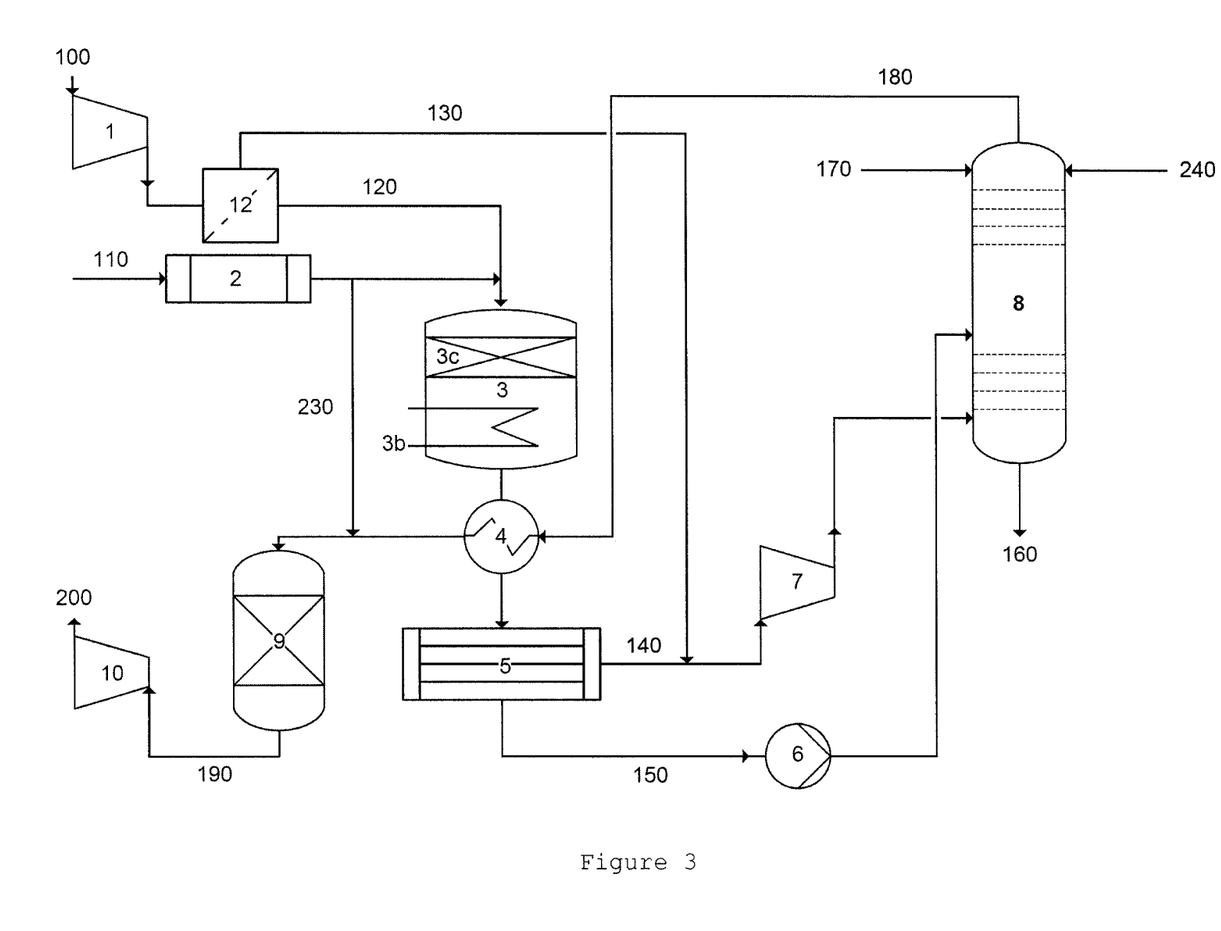

FIG. 3 describes further variants of the method according to the invention and of a system according to the invention using the example of a dual pressure nitric acid system. Air compressor (1), ammonia evaporator (2), reactor (3), catalyst bed (3c), heat exchangers (3b, 4), condenser (5), pump (6), process gas compressor (7), absorption tower (8), residual gas purification (9) and residual gas turbine (10) as well as lines 100, 110, 140, 150, 160, 170, 180, 190, 200 and 230 correspond in principle to the elements shown in FIG. 2 in terms of their function and interconnection. There is additionally provided in the system of FIG. 3 a device (12) for decomposing air, into which the compressed air coming from air compressor (1) is introduced. In device (12) there is carried out a (partial) separation of air into a portion having a reduced oxygen content and a portion having an increased oxygen content. The gas mixture having an increased nitrogen content is fed into line 120 and supplied to the reactor (3). The gas mixture having the increased oxygen content is fed into line 130 and supplied in line 140 to the gas mixture coming from the condenser (5) and containing predominantly $NO_x$. By means of these measures, a desired ratio of oxygen to ammonia in the reactant gas mixture can likewise be adjusted in a controlled manner.

There is additionally shown in FIG. 3 a line 240 via which a peroxide-containing liquid stream can be guided into the absorption tower (8). The supply of this stream forms an alternative possibility for supplying the oxygen required for the NO oxidation in the absorption tower. This measure can be operated as an alternative or in combination with the above-mentioned measure E, that is to say a device, arranged between the reactor (3) for ammonia oxidation and the absorption tower (8), for combining the $NO_x$-containing process gas stream with an oxygen-containing gas stream.

Figure 4:
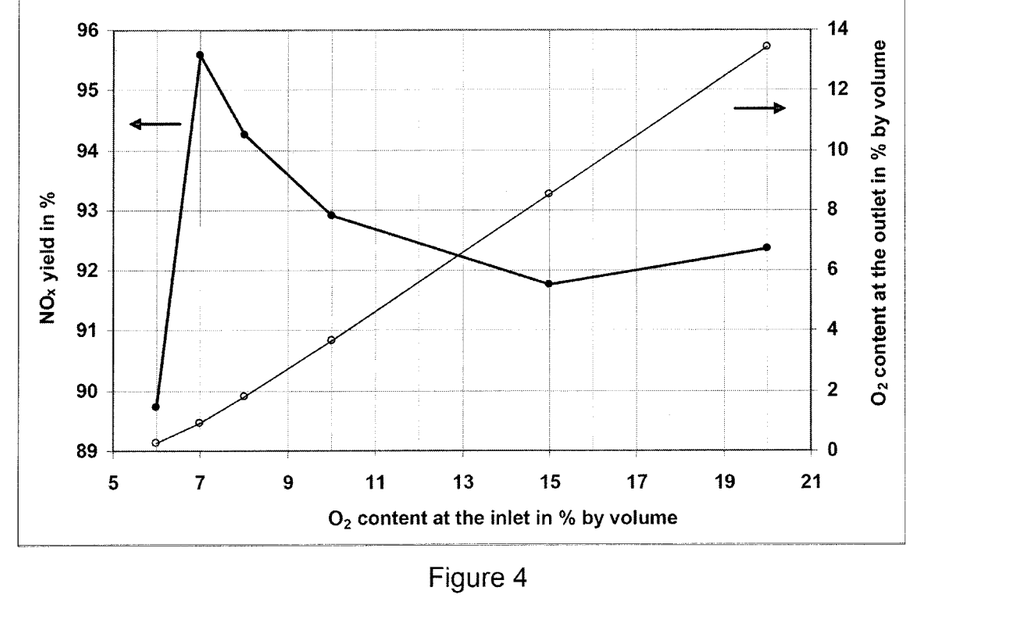
FIGS. 4, 5, and 6 show the dependence of the $NO_x$ yield on the oxygen content in the reactant gas mixture, or on the molar ratio of oxygen to ammonia in the reactant gas mixture, for three variants of the method according to the invention.
Figure 5:
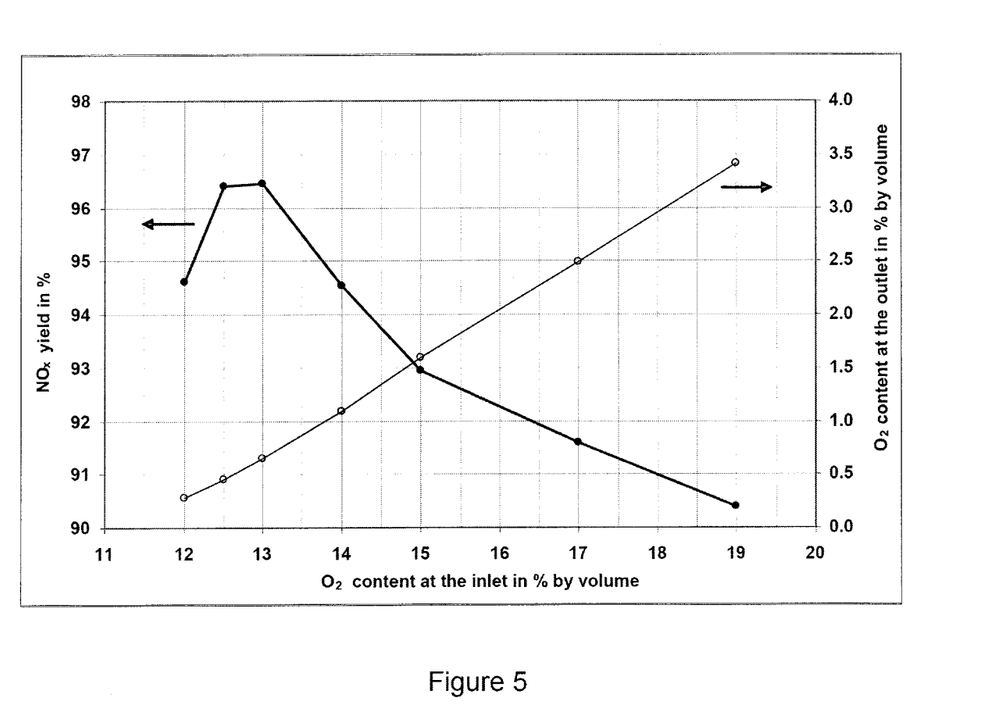
Figure 6:
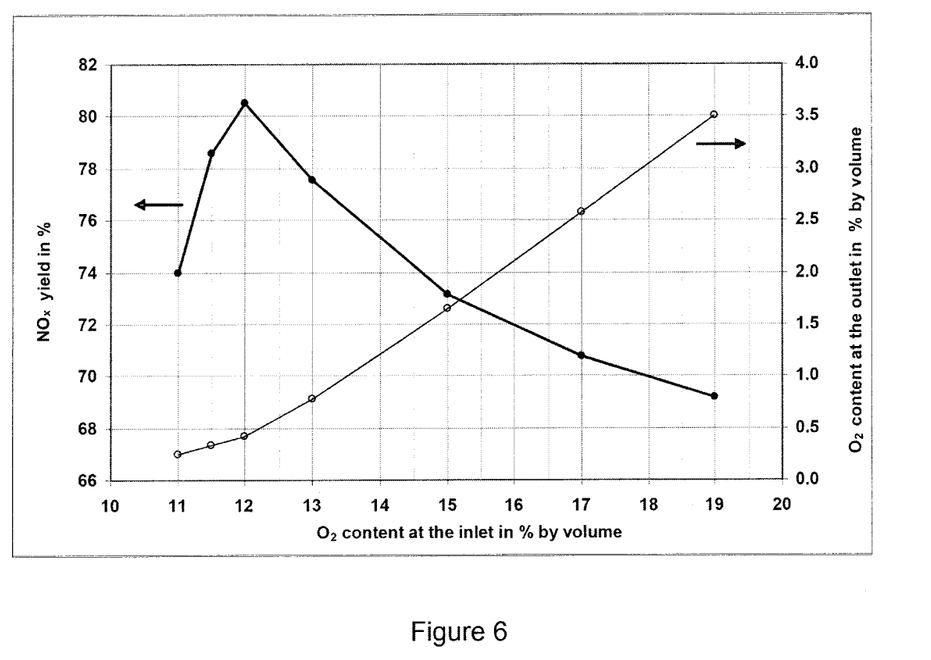

FIGS. 4 to 6 show, using the examples of chosen transition metal oxide catalysts (FIGS. 4 and 5: active component $LaCoO_3$; FIG. 6: active component $LaMnO_3$), how, in the oxidation of $NH_3$, increased yields of $NO_x$ can be achieved for different variants of the method according to the invention on a laboratory scale by reducing the oxygen content in a gas mixture comprising ammonia and oxygen, that is to say by adjusting the ratio according to the invention of the molar amounts of oxygen and ammonia at the inlet of the reactant gas mixture into the catalyst bed.

To that end, honeycomb catalysts having a length of 1 cm, a diameter of approximately 18 mm and a cell density of 200 cpsi or 400 cpsi were inserted into a tubular reactor of quartz glass having an inside diameter of 20 mm, and a synthetic gas mixture of ammonia, oxygen and nitrogen was passed through. Analysis of the gas streams was carried out by means of thermal mass flow devices (MFC), whereby, with set ammonia concentrations of 5% by volume (FIG. 4) and 10% by volume (FIGS. 5 and 6), the oxygen concentration was varied in the ranges of from 20 to 6% by volume (FIG. 4) and from 19 to 12% by volume (FIG. 5) or 19 to 11% by volume (FIG. 6). The space velocity was in each case 100,000 h$^{-1}$. By means of pressure regulation at the reactor outlet, an operating pressure of 4.5 bar (FIGS. 4 and 6) or 2.0 bar (FIG. 5) was established. The individual conditions of the examples shown in FIGS. 4 to 6 are listed in the following table.

| Conditions | FIG. 4 | FIG. 5 | FIG. 6 |
|---|---|---|---|
| Active component | LaCoO$_3$ | LaCoO$_3$ | LaMnO$_3$ |
| Honeycomb length | 1 cm | 1 cm | 1 cm |
| Honeycomb diameter | 18 mm | 18 mm | 18 mm |
| Cell density | 200 cpsi | 400 cpsi | 200 cpsi |
| Space velocity | 100,000 h$^{-1}$ | 100,000 h$^{-1}$ | 100,000 h$^{-1}$ |
| Pressure | 4.5 bar | 2.0 bar | 4.5 bar |
| Outlet temperature | 750° C. | 825° C. | 900° C. |
| NH$_3$ inlet concentration | 4.5-4.8% by volume | 9.1-9.3% by volume | 9.1-9.2% by volume |
| O$_2$ inlet concentration | 6-20% by volume | 12-19% by volume | 11-19% by volume |

In order to compensate for heat losses, the reaction tube was surrounded by a metal jacket and placed in two tubular furnaces arranged one above the other. The resulting reaction temperature was measured by means of a thermoelement approximately 1 mm below the honeycomb (Tout). This outlet temperature was approximately 750° C. in the case of the ammonia inlet concentration of 5% by volume (FIG. 4) and 825° C. (FIG. 5) or approximately 900° C. (FIG. 6) at 10% by volume. Analyses of the test gas were carried out by switching alternately from the inlet and outlet of the reactor to an analyzer. The analyzer used for determining the volume concentrations of ammonia, nitrogen monoxide (NO), nitrogen dioxide (NO$_2$) and water was an FT-IR device (model "6700 Advanced Gold" from Thermo-Nicolet) equipped with a heated gas cuvette having a length of 15 cm. The O$_2$ concentration was determined by means of the OXYMAT 6 device, heated version, from Siemens.

The indicated volume concentrations correspond at a first approximation to the molar concentrations of the individual components. For each adjustment of a new oxygen inlet concentration, the attainment of a steady-state operating point was awaited on the basis of the analytical result of the gas at the reactor outlet. In FIGS. 4 to 6, the calculated yields of the sum parameter NO$_x$ (=NO+NO$_2$), based on the ammonia inlet concentration, in dependence on the oxygen inlet concentration are plotted, wherein, for calculating the NO$_x$ yield from the molar concentrations, the volume changes associated with the individual primary reactions (schemes 1, 5, 6 and 7) are taken into account.

There can clearly be seen in each case a pronounced maximum in the NO$_x$ yield corresponding to the density of the measuring points in FIG. 4 localized at an O$_2$ content of 7% by volume, corresponding to a ratio of the molar O$_2$ and NH$_3$ inlet concentrations of 1.4 mol/mol, in FIG. 5 at an O$_2$ content of 13% by volume, corresponding to a ratio of the molar O$_2$ and NH$_3$ inlet concentrations of 1.3 mol/mol, and in FIG. 6 at an O$_2$ content of 12% by volume, corresponding to a ratio of the molar O$_2$ and NH$_3$ inlet concentrations of 1.2 mol/mol.

There can further clearly be seen that, at a ratio of the molar O$_2$ and NH$_3$ inlet concentrations of 1.9 mol/mol, which is not in accordance with the invention and is typically used in conventional industrial processes for ammonia oxidation (10% by volume NH$_3$ in air), a significantly lower NO$_x$ yield is achieved than in the range chosen according to the invention around the optimal molar ratio of oxygen to ammonia.

If the ratio is below the above-mentioned range, the NO$_x$ yield is reduced significantly, as can be seen in FIG. 4 at an O$_2$ content of 6% by volume, corresponding to a ratio of the molar O$_2$ and NH$_3$ inlet concentrations of 1.2 mol/mol, in FIG. 5 at an O$_2$ content of 12% by volume, corresponding to a ratio of the molar O$_2$ and NH$_3$ inlet concentrations of 1.2 mol/mol, and in FIG. 6 at an O$_2$ content of 11% by volume, corresponding to a ratio of the molar O$_2$ and NH$_3$ inlet concentrations of 1.1 mol/mol.

The honeycomb bodies were produced by extrusion of correspondingly treated LaMnO$_3$ or LaCoO$_3$ powders, with addition of corresponding binders and plasticizing aids and subsequent drying and calcination. The starting powders for the tested catalysts were produced by alkaline precipitation from stoichiometrically prepared solutions of the corresponding metal salts, filtration, washing and finally calcination of the precipitates thereby obtained. The phase formation and purity of the respective perovskite phases was checked by XRD (X-ray diffractometry).

The invention claimed is:

1. A system for oxidizing ammonia, comprising:
   a reactor configured for ammonia oxidation, the reactor being equipped with at least one supply line for a reactant gas mixture and with at least one discharge line for a process gas;
   a catalyst arrangement inside the reactor, with a catalyst of the catalyst arrangement comprising at least one transition metal oxide that is not an oxide of a platinum metal;
   an ammonia source configured for providing ammonia, the ammonia source being connected to an adjusting device via a line for gaseous ammonia;
   an air separation device configured to carry out a partial separation of an air stream to obtain an oxygen-depleted gas stream having an O$_2$ content of <20% by volume and an oxygen-enriched gas stream having more than 25% by volume oxygen, the air separation device being connected to the adjusting device via a line for the oxygen-depleted gas stream, wherein the air separation device is a pressure swing adsorption device, a cryogenic decomposition device, or a membrane separation device;
   the adjusting device, wherein the adjusting device is configured for mixing the oxygen-depleted gas stream with a stream of gaseous ammonia to obtain the reactant gas mixture having a molar ratio of oxygen to ammonia of less than or equal to 1.75 mol/mol, the adjusting mixing device being connected to the ammonia source via the line for gaseous ammonia, to the oxygen depletion device via the line for the oxygen-depleted gas stream, and to the reactor via the at least one supply line for the reactant gas mixture;

an absorption tower configured for absorbing $NO_x$ and forming $HNO_3$, $HNO_2$ or solutions of nitrates or nitrites, the absorption tower being connected to the at least one discharge line for the process gas via a line for an $NO_x$-containing process gas stream; and the air separation device connected to the line for the $NO_x$-containing process gas stream via a line for the oxygen-enriched gas stream, wherein the line for the oxygen-enriched gas stream and the line for a $NO_x$-containing process gas stream are configured for combining the $NO_x$-containing process gas stream with the oxygen-enriched gas stream.

2. The system as claimed in claim 1 comprising a device for adjusting an outlet temperature of a process gas from the reactor based on a concentration of ammonia of the reactant gas mixture at an inlet of the reactor.

3. The system as claimed in claim 1 comprising a device, arranged between the reactor for ammonia oxidation and the absorption tower, for combining the NOx-containing process gas stream with the oxygen-enriched gas stream that comprises more than 25% oxygen.

4. The system as claimed in claim 1 wherein the air separation device is a cryogenic decomposition device.

5. The system for oxidizing ammonia as claimed in claim 1 comprising a peroxide input and configured for introducing a peroxide-containing stream into the absorption tower, the peroxide input being connected to the absorption tower via a line for the peroxide-containing stream that opens into the absorption tower.

6. The system as claimed in claim 1 wherein the adjusting device is configured to output the reactant gas mixture with a molar ratio of oxygen to ammonia that is between 1.25 and 1.75 mol/mol.

7. The system as claimed in claim 1 comprising cooling means for cooling reactor walls of the reactor, wherein at least a portion of a heat of reaction in the reactor is dissipated by cooled reactor walls.

8. The system as claimed in claim 1 comprising an integrated cooling device in the catalyst arrangement, wherein the integrated cooling device is configured to dissipate at least a portion of a heat of reaction in the reactor.

9. The system as claimed in claim 1 wherein the catalyst arrangement comprises at least one of (1) doped transition metal oxides that are not oxides of the platinum metals; or (2) mixed oxides of such transition metal oxides, wherein the mixed oxides have spinel, delafossite, perovskite, or brownmillerite structure.

10. The system as claimed in claim 1 further comprising a compressor for compressing the air stream prior to entry into the air separation device.

11. The system as claimed in claim 10 wherein the adjusting device is configured for introducing a chosen amount of ammonia into the air stream that has been compressed.

12. The system as claimed in claim 10 comprising a second compressor for compressing an oxygen-containing secondary gas stream, wherein the system is configured such that the compressed oxygen-containing secondary gas stream is added to the process gas prior to entry into the absorption tower.

13. The system as claimed in claim 1 wherein the catalyst arrangement is configured to output the process gas at a temperature of 700° C. to 950° C.

14. The system as claimed in claim 13 wherein the reactant gas mixture comprising ammonia and oxygen has an inlet temperature into a catalyst bed from 20° C. to 300° C.

15. The system of claim 1 comprising:
the oxygen-depleted gas stream with the $O_2$ content of <20% by volume disposed within the line for the oxygen-depleted gas stream;
the reactant gas mixture having the molar ratio of oxygen to ammonia of less than or equal to 1.75 mol/mol disposed within the supply line; and
the oxygen-enriched gas stream that is enriched to more than 25% oxygen disposed within the line for the oxygen-enriched gas stream.

16. A system for oxidizing ammonia, comprising:
a reactor configured for ammonia oxidation, the reactor being equipped with at least one supply line for a reactant gas mixture and with at least one discharge line for a process gas;
a catalyst arrangement inside the reactor, a catalyst of the catalyst arrangement comprising at least one transition metal oxide that is not an oxide of a platinum metal;
an adjusting device configured for mixing;
an ammonia source configured for providing ammonia, the ammonia source being connected to the adjusting device via a line for gaseous ammonia;
a diluting gas steam having an $O_2$ content of <20% by volume and being connected to the adjusting device;
an absorption tower configured for absorbing $NO_x$ and forming $HNO_3$, $HNO_2$ or solutions of nitrates or nitrites, the absorption tower being connected to the at least one discharge line for the process gas from the reactor via a line for an NOR-containing process gas stream;
a line for a residual gas leaving the absorption tower for input back into the adjusting device; and a line for an air stream connected to the adjusting device;
wherein:
the adjusting device mixes the air stream, the diluting gas stream, the gaseous ammonia from the ammonia source, and the residual gas from the absorption tower to obtain the reactant gas mixture; and
the reactant gas mixture has a molar ratio of oxygen to ammonia of less than or equal to 1.75 mol/mol.

17. The system of claim 16 wherein the diluting gas stream comprises water vapor or a nitrogen stream containing less than 20% by volume oxygen.

18. The system of claim 16 comprising a compressor configured to compress the air stream supplied to the adjusting device.

19. A system for oxidizing ammonia, comprising:
a reactor configured for ammonia oxidation, the reactor being equipped with at least one supply line for a reactant gas mixture and with at least one discharge line for a process gas;
a catalyst arrangement inside the reactor, a catalyst of the catalyst arrangement comprising at least one transition metal oxide that is not an oxide of a platinum metal;
an ammonia source configured for providing ammonia, the ammonia source being connected to an adjusting device via a line for gaseous ammonia;
a line that contains an oxygen-depleted gas stream having an O2 content of <20% by volume, the line that contains the oxygen-depleted gas stream being connected to the adjusting device;
an absorption tower configured for absorbing NOx and forming $HNO_3$, $HNO_2$ or solutions of nitrates or nitrites, the absorption tower being connected to the at least one discharge line for the process gas via a line for an NOx-containing process gas stream; and an air separation device configured to carry out a partial separation of an air stream to obtain an oxygen-enriched gas stream having more than 25% by volume oxygen and connected to the line for the NOx-containing process gas stream via a line for the oxygen-enriched gas stream, wherein the line for the oxygen-enriched gas stream and the line for a NOx-containing process gas stream are configured for combining the NOx-containing process gas stream with the oxygen-enriched gas stream;

wherein:
   the reactant gas mixture has a molar ratio of oxygen to ammonia of 1.25 to 1.75 mol/mol disposed within the supply line;
   the adjusting device is configured for mixing the oxygen-depleted gas stream with a stream of gaseous ammonia to obtain the reactant gas mixture having a molar ratio of oxygen to ammonia of 1.25 to 1.75 mol/mol; the adjusting device being connected to the ammonia source via the line for gaseous ammonia, to the line containing the oxygen-depleted gas stream, and to the reactor via the at least one supply line for the reactant gas mixture; and the process gas disposed within the discharge line leaves the reactor, wherein the process gas leaving the reactor includes up to 4.0% by volume oxygen.

* * * * *

UNITED STATES PATENT AND TRADEMARK OFFICE
CERTIFICATE OF CORRECTION

| | | |
|---|---|---|
| PATENT NO. | : 11,820,653 B2 | Page 1 of 1 |
| APPLICATION NO. | : 16/534044 | |
| DATED | : November 21, 2023 | |
| INVENTOR(S) | : Meinhard Schwefer et al. | |

It is certified that error appears in the above-identified patent and that said Letters Patent is hereby corrected as shown below:

On the Title Page

Insert item (30) Foreign Application Priority Data:
--March 14, 2013, (DE) 102013004341.7--

Signed and Sealed this
Thirtieth Day of January, 2024

Katherine Kelly Vidal
*Director of the United States Patent and Trademark Office*